Figure 1:
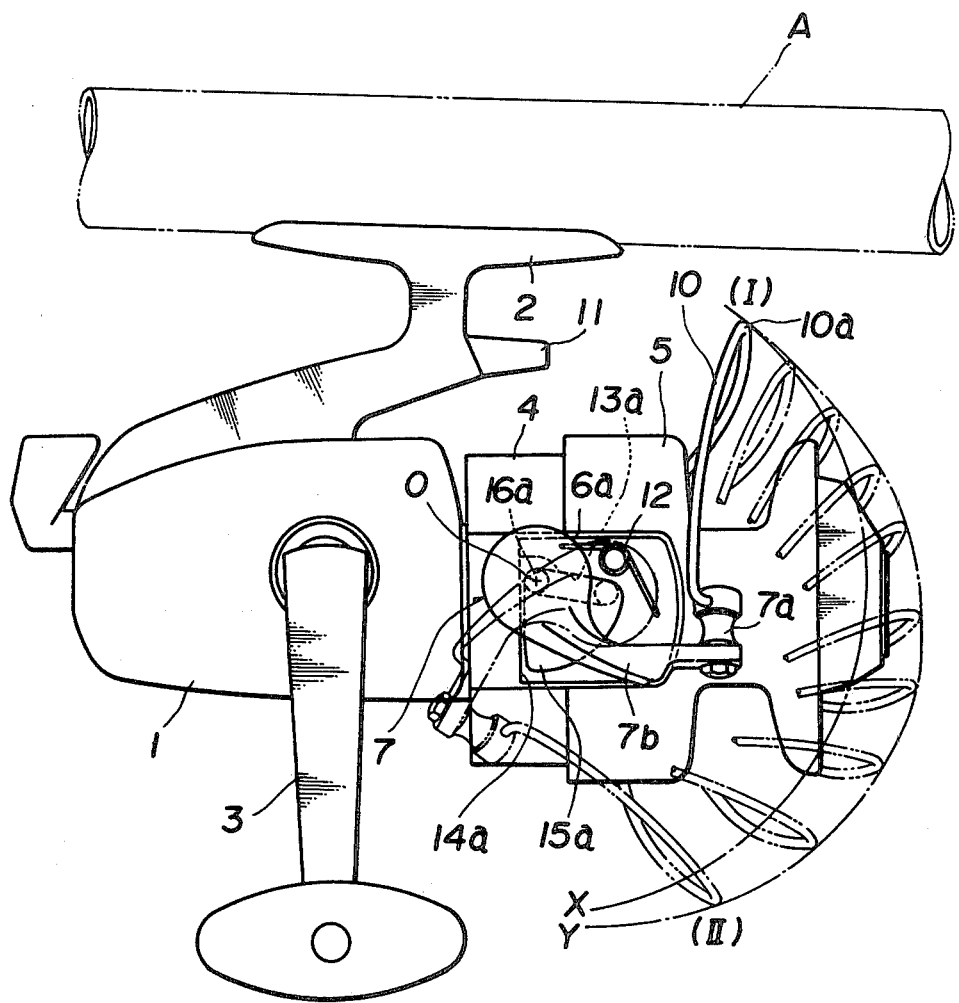

United States Patent [19]

Ishida et al.

[11] 4,202,508
[45] May 13, 1980

[54] SPINNING TYPE FISHING REEL

[75] Inventors: Takuo Ishida, Sennan; Masuo Ban, Sakai, both of Japan

[73] Assignee: Shimano Industrial Company Limited, Osaka, Japan

[21] Appl. No.: 892,319

[22] Filed: Mar. 31, 1978

[30] Foreign Application Priority Data

Apr. 19, 1977 [JP] Japan .................................. 52-45258
Jun. 7, 1977 [JP] Japan .................................. 52-67510

[51] Int. Cl.² ............................................ A01K 89/01
[52] U.S. Cl. .............................................. 242/84.2 G
[58] Field of Search ..................... 242/84.2 G, 84.21 R

[56] References Cited

U.S. PATENT DOCUMENTS

| 2,777,645 | 1/1957 | Wood | 242/84.21 R |
| 2,799,457 | 7/1957 | Martini | 242/84.21 R |
| 3,987,976 | 10/1976 | Lilland | 242/84.21 R |

FOREIGN PATENT DOCUMENTS 1213235 10/1959 France .................................. 242/84.2 G Primary Examiner—Billy S. Taylor
Attorney, Agent, or Firm—Stevens, Davis, Miller & Mosher

[57] ABSTRACT

A spinning type fishing reel having a bail arm which is rotatably mounted at both ends thereof to diametrically opposite sides of a rotary frame so that an intermediate portion of the bail arm may turn over and pass across the front of a spool in swinging motion between two positions where a fishing line is respectively guided to be wound up, and released. The point around which the bail arm swings is made movable longitudinally of the reel, thereby allowing the bail arm to be turned over by elongating the distance between a crest of the intermediate portion of the bail arm and the basic position where the arm is supported for guiding therethrough the line to be wound onto the spool.

11 Claims, 12 Drawing Figures

SPINNING TYPE FISHING REEL

This invention relates to a spinning type fishing reel, and more particularly to a spinning type fishing reel whose bail arm is semi-circular and diametrically supported at both opposite ends to a rotary frame so as to be turned over in a swinging motion between two positions of the bail arm where a fishing line is guided to be wound-up on and released to be drawn out from a spool.

It is known that a conventional spinning reel has a short mounting leg for mounting the reel body as close as possible to the rod so that an operating handle may be stably and smoothly turned for winding up a fishing line onto a spool. As a result, high speed line-winding becomes possible and a well balanced rod enables a fishing rig at an end of the line to be cast accurately a great distance. However, mounting the reel too close to the rod causes the bail arm, when rotating, to contact at its intermediate portion with the rod. In order to overcome this problem, the bail arm is constructed so as not to project excessively from the lateral side of rotary frame; in other words, it projects enough to rotate very close to the frame. However, if the bail arm is close to the frame it is, when turned over in a swinging motion, hit by the spool and prevented from passing across the front thereof. In addition, the points around which the bail arm swings are, in the conventional reel, shifted longitudinally forwardly of the reel body (toward the spool) so that the bail arm may swing without contact with the spool, but such a construction makes it hard to uniformly wind up the line onto the spool.

In detail, when the aforesaid points are shifted forwardly of the reel body, the bail arm guides the line at the forwardly shifted position so that the spool axially reciprocates out of the proper guiding position of the bail arm, thereby preventing the line from being ununiformly wound onto the spool. Furthermore, the bail arm encounters difficulty in automatically turning over due to a larger angle of turn and the conventional torsion spring supplies insufficient retaining force for holding the bail arm at each of its two stable positions. Hence, these problems make it difficult in practise to shift forwardly the center of a bail arm swing.

The invention has been designed to overcome the noted problems. An object of the invention is to provide a spinning type fishing reel which is, when attached to the fishing rod, capable of being smoothly and stably operated enabling an operator with a well balanced rod to accurately cast a fishing rig a great distance.

This invention is characterized in that a spinning type fishing reel having a bail arm is constructed such that the center of the swing of the bail arm across the front of the spool is made shiftable longitudinally of the reel to thereby elongate a distance between a basic point where the bail arm is kept to guide the line to be wound on the spool and a crest of the intermediate portion of the arm when it turns over in a swinging motion. In addition, the basic point fixes the position of the bail arm end when kept to guide the line to be wound up, so that the bail arm is turned over on a basis of the basic point. The basic point differs from the center of a swing or they may be identical with each other, but the former is always fixed.

Figure 2:
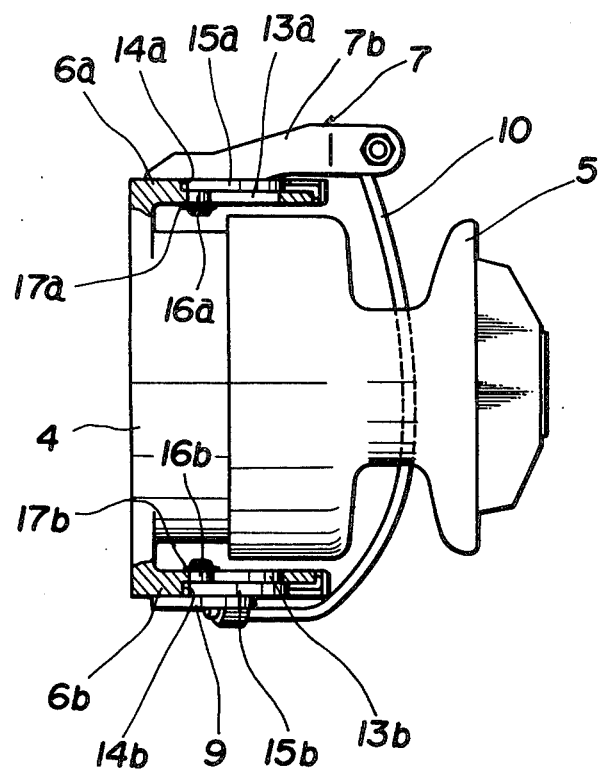
Figure 3:
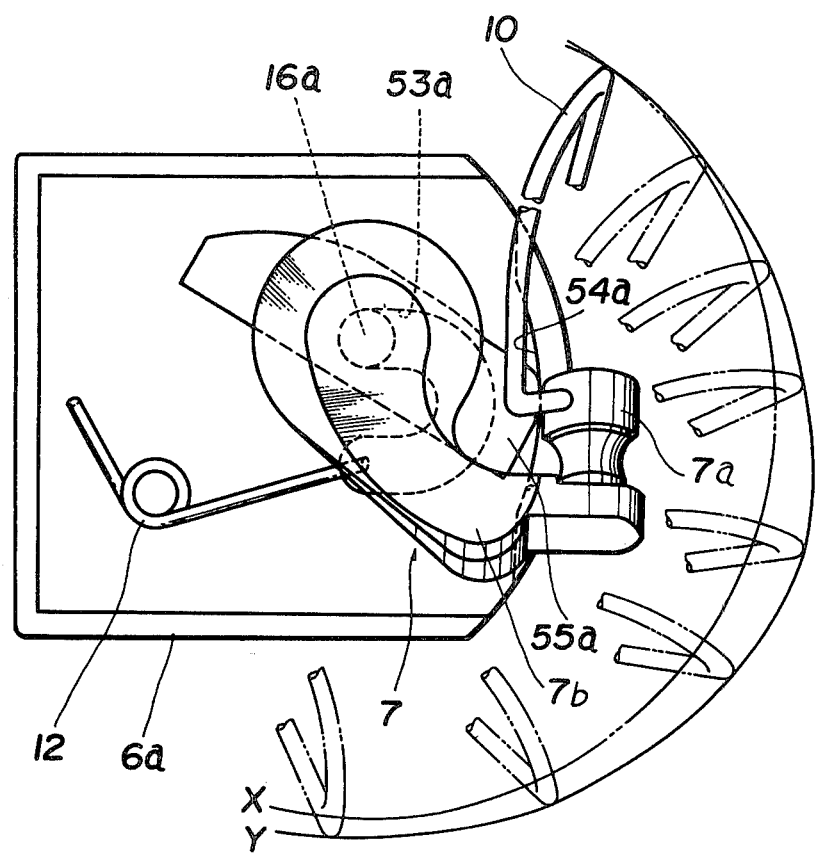
Figure 4:
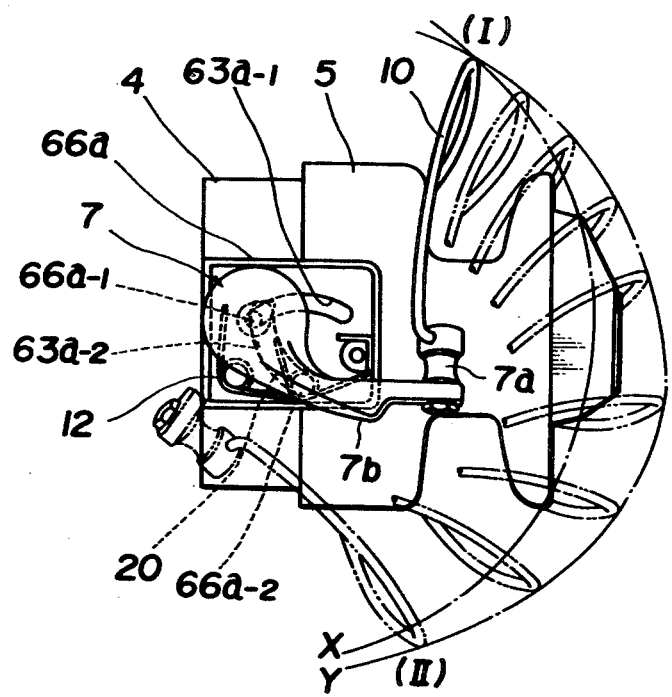
Figure 5:
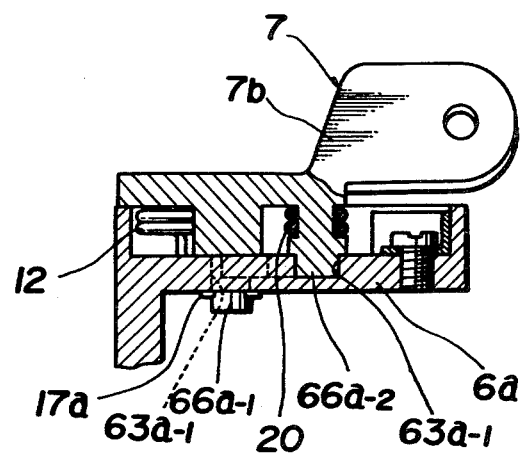
Figure 6:
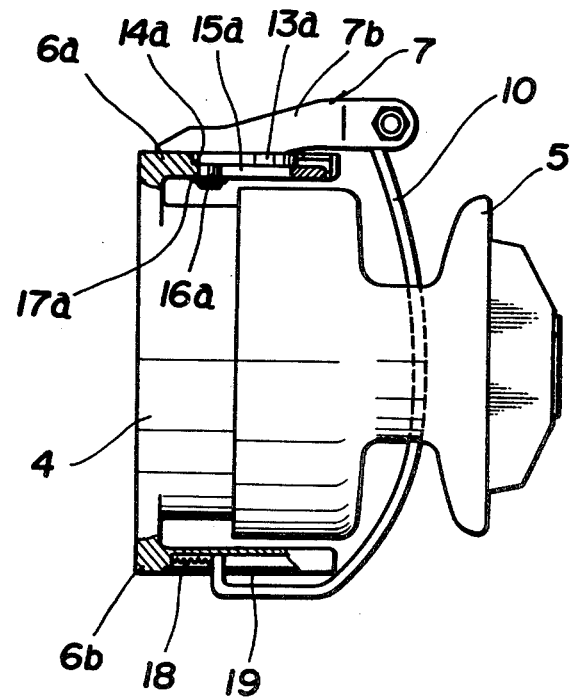

These and other objects of the invention will become more apparent in the detailed description and appended drawings, in which:

FIG. 1 is a side view of an embodiment of the invention,

FIG. 2 is a partially omitted and partially cutaway bottom view of the reel in FIG. 1, FIG. 3 is an enlarged side view only of the principal portion of a modified embodiment of the invention, FIG. 4 is a side view only of the principal portion of another modified embodiment, FIG. 5 is a partially sectional view of the FIG. 4 embodiment, and FIG. 6 is a partially cutaway bottom view of a further modified embodiment, which corresponds to FIG. 2.

Figure 7:
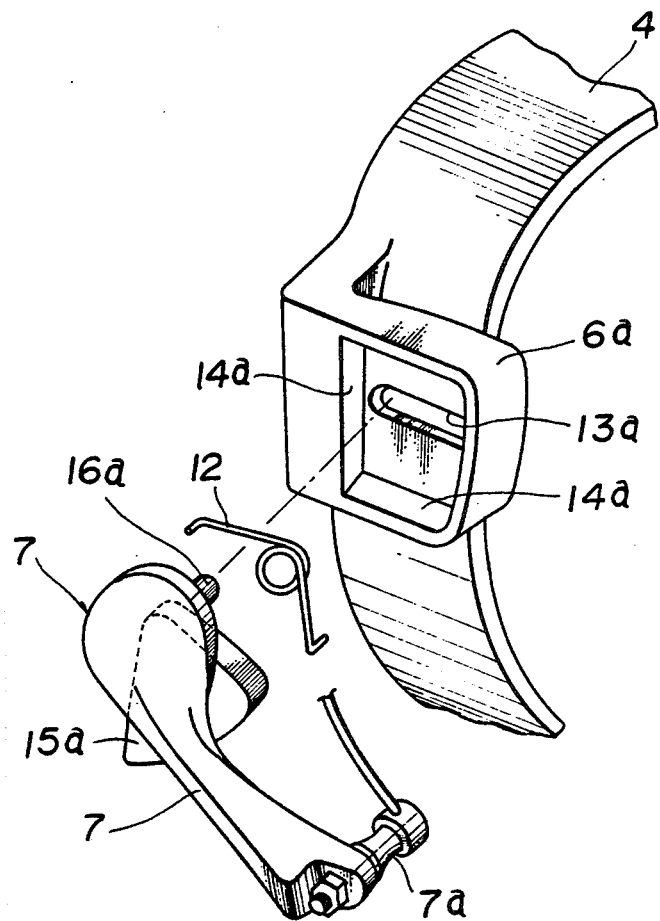
Figure 8:
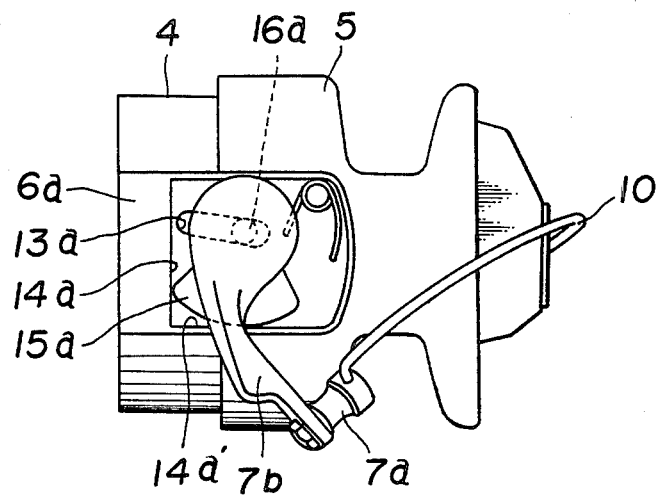
Figure 9:
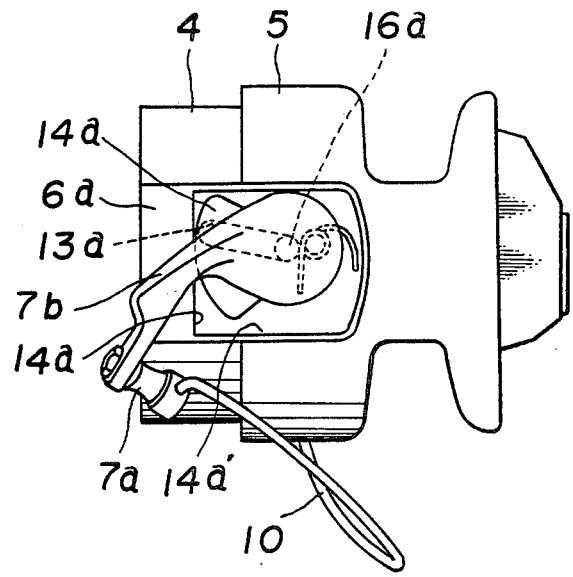
Figure 10:
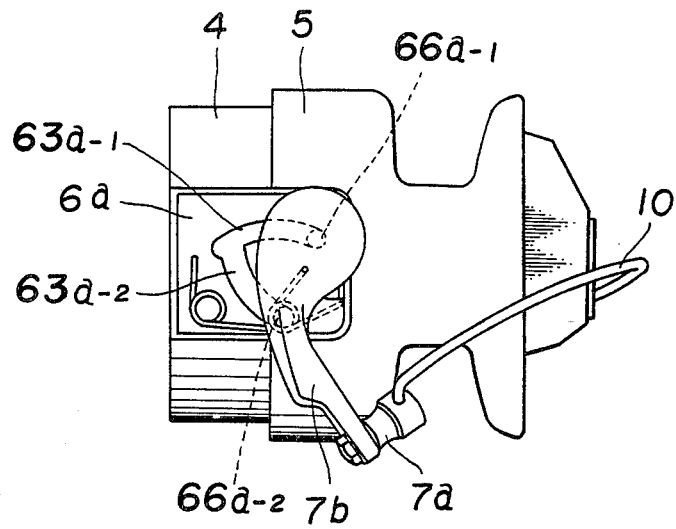
Figure 11:
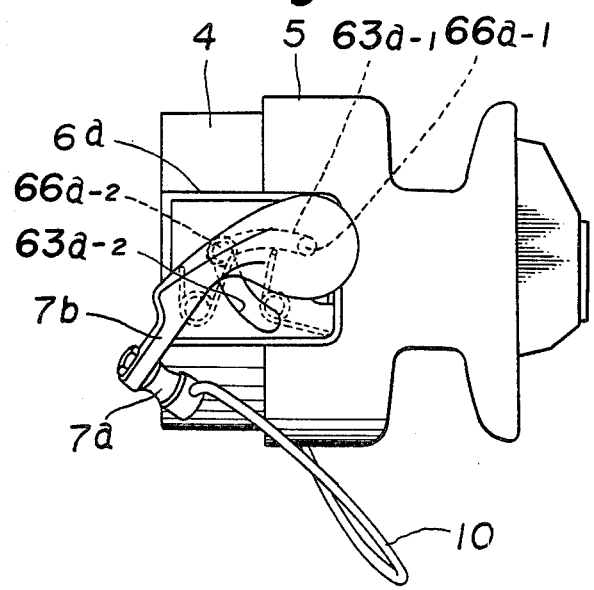
Figure 12:
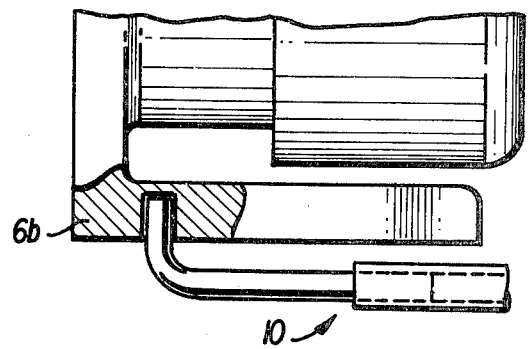

FIG. 7 ios a perspective view of the FIG. 1 embodiment,

FIG. 8 is a side view of the FIG. 1 embodiment at an intermediate point in the movement of the bail arm, FIG. 9 is a side view of the FIG. 1 embodiment after the swinging movement of the bail arm, FIG. 10 is a side view of the FIG. 4 embodiment at an intermediate point in the movement of the bail arm, FIG. 11 is a side view of the FIG. 4 embodiment after the swinging movement of the bail arm FIG. 12 is a partial cutaway bottom view of a modification to the FIG. 6 embodiment.

In the drawings, the reference numeral 1 designates a reel body having a leg 2 for mounting the reel to a fishing rod A. The reel body 1 provides a handle shaft (not shown) having an operating handle 3 and a tubular shaft (not shown) having a cylindrical rotary frame 4, which are respectively journaled to the side and front of the reel body. The operating handle 3 is turned to rotate the rotary frame 4 through the tubular shaft associated with the handle. Within the tubular shaft is inserted a spool shaft (not shown) of a spool 5 which is movable axially thereof, the spool shaft being connected to the handle shaft in association therewith through a rotation-reciprocation mechanism, so that the handle is turned to axially reciprocate the spool.

A pair of support arms 6a and 6b extending integrally with and forwardly from the lateral surface of the rotary frame 4 are arranged diametrically opposite to each other. One arm 6a carries a first support 7 having an arm roller 7a and an arm cam 7b, and the other 6b carries a second support 9. A bail arm 10 made from a semi-circular wire is mounted, at a first end thereof, to the arm roller 7a of the first support 7 and, at a second end, to the second support 9. The bail arm 10 passes at its intermediate portion across the front of the spool 5 in swinging motion between the position I shown by the solid line and that II shown by the phantom line in FIG. 1, whereby the bail arm 10 is rotated at the position I together with the rotary frame 4 so as to guide the line to be wound up onto the spool 5 and is turned over in swinging motion to the position II so as to allow the line to be released for casting. In FIG. 1, the reference numeral 11 designates a projection against which the arm cam 7b is abutted to turn over the bail arm 10, and numeral 12, designates a conventional torsion spring for retaining the bail arm 10 at each of the aforesaid positions I and II.

The basic construction of the spinning type fishing reel described above is well-known, and its basic operation will be understandable with a further detailed description.

In a spinning type fishing reel of the invention the distance between the supporting basic point 0 of each end of the bail arm at the line guiding position I as shown in FIG. 1 and a crest of the intermediate portion 10a of the bail arm 10 is made larger when the bail arm is turned over in swinging motion. As seen from FIG. 1, the crest of bail arm 10 passes through the locus Y different from the conventional locus X.

Next, the spinning reel construction which causes the extension of the bail arm as it passes across the front of the spool will be described.

A main point of the invention is that when the bail arm 10 is turned over, the point around which the bail arm swings is moved forwardly of the spool 5 with respect to the basic arm-supporting point 0 so that the intermediate portion 10a of bail arm 10 may be shifted forwardly with respect to the spool 5. To achieve this operation at least one of the supports 7 and 9 is provided with a stud orienting the bail arm relative to the rotary frame 4. At the rotary frame 4, preferably the support arm 6a or 6b formed thereat, is provided a bearing for rotatably supporting the stud. The bearing has an inner elongated slot extending longitudinally of the reel body 1, whereby when the bail arm 10 is turned over the stud is moved forwardly along and within the slot to shift the intermediate portion of the bail arm forwardly with respect to the spool 6.

In a first embodiment shown in FIGS. 1, 2 and 7 respective bearings are provided at the support arms 6a and 6b. The slots 13a and 13b of the bearings are elongated in a circular arc. The first and second supports 7 and 9 are pivotably attached to the support arms 6a and 6b via studs 16a and 16b respectively, so that the first and second ends of the bail arm 10 are movable together when the bail arm 10 is turned over.

In this embodiment, the studs 16a and 16b are forcibly moved along the bearing slots 13a and 13b when the bail arm 10 is turned over. The studs are moved through cams 15a and 15b which have a quarter of circle-like shape as shown in FIG. 1 and which are fixed to the first and second supports 7 and 9. These cams rotate with their respective supports 7 and 9 as the bail arm swings and abut respective cam contact faces 14a and 14b, provided at the rear side of each of the support arms 6a and 6b as illustrated in FIG. 1. The abuttment of cams 15a and 15b with their respective cam contact faces creates a pivot point about which studs 16a and 16b swings to move along bearing slots 13a and 13b. When the studs 16a and 16b reach the ends of the slots, this creates a pivot point about which the supports 7 and 9 swing until the bail arm reaches it rest position.

The reference numerals 17a and 17b designate snap rings fitted to the foremost end of the studs 16a and 16b inserted into the bearing slots 13a and 13b, thereby preventing the studs from escaping.

The spinning type fishing reel of the invention constructed as described operates as follows: when the bail arm 10 is at the position I for guiding the line to be wound in a spool, the first and second supports 7 and 9, which support the bail arm 10 to the rotary frame 4, are pushed backward by the torsion spring 12 so as to urge the studs 16a and 16b against the rear end of the bearing slots 13a and 13b as shown in FIG. 1, so that the operating handle 3 may be turned to rotate the rotary frame 4 to thereby wind up the line onto the spool 5 through the bail arm 10. The bail arm 10 may be turned over from the position I to that of II for releasing the line against the torsion spring 12 to thereby permit casting of the line for fishing. When this occurs, both the supports 7 and 9 tend to rotate around the studs 16a and 16b, but the cams 15a and 15b at the supports 7 and 9 are abutted against the cam contact faces 14a and 14b to restrict the rotation of both the supports 7 and 9. Hence, the studs 16a and 16b must move along the bearing slots 13a and 13b forwardly of the reel body 1, to permit continued rotation of the first and second supports 7 and 9 which respectively follow the movement of studs 16a and 16b. See FIG. 8. Then, the studs 16a and 16b reach the terminal ends of slots 13a and 13b and both the supports 7 and 9 further rotate to finish the overturn of bail arm 10 and thereafter the line is released for casting. See FIG. 9. Next, the bail arm 10 is, if necessary, returned to its original position by the operation of handle 3 which is turned to rotate the rotary frame 4, thereby causing the arm cam 7b to be hit by the projection 11, thus automatically turning over the bail arm 10 through restoration of the torsion spring 12.

As seen from above, particularly in FIGS. 1, 8 and 9 the bail arm 10 is turned over through the first and second supports 7 and 9 moving forwardly of the reel so as to increase the distance between the center 0 of a swing and the crest of an intermediate portion 10a of bail arm 10, that is, the locus of intermediate portion 10a is ahead of the locus in a conventional spinning reel. Hence, the semi-circular bail arm 10 is, even when made smaller in diameter, not brought into contact with the spool 5 when turned over in swinging motion through the front of the spool 5 from the position I for guiding the line to be wound to that of II for releasing it.

As a result, the smaller diameter semi-circular bail arm 10 enables the mounting leg 2 to be shortened to thereby make it possible to allow the whole reel to approach the rod A and also to prevent the bail arm 10 from being hit by the spool even when the reel is close to the rod A.

Next, other modified embodiments of the invention will be described.

One of the supports 7 and 9 supporting the first and second ends of bail arm 10 in the manner described above may be omitted and the other only, for example, the first support 7, may, as shown in FIG. 6, be used for supporting the first end, while the second end is directly supported to the support arm 6b.

In this instance, the second end of the bail arm 10 is supported to the support arm 6b in relation of being movable longitudinally of the reel. An elongate slot 19 extending longitudinally of the reel is provided at the support arm 6b, through which the second end is supported, and a tension spring 18 is provided between the rear end of the slot 19 and the second end of bail arm 10, so that the second end may be pulled toward the rear end of the slot 19.

In addition, the second end may be not-axially-movably supported to the support arm 6b, in which case the bail arm 10 may be made telescopic and separable between the second and intermediate ends so as to be extended near the fixed end during its swinging movement. This is shown in FIG. 12.

As a further modification, U-shaped bearing slots 53a and 53b may be used as shown in FIG. 3, other than shaped in a circular arm as described above. In this instance, the cams 55a and 55b at the support arms 7 and 9, are made about dome-like shaped and cam contact faces 54a and 54b are provided at the front of each of the support arms 6a and 6b. As in the FIG. 1 embodiment, when cams 15a and 15b abut respective cam contact faces 14a and 14b during bail arm swing, it causes studs 16a and 16b to move along slots 13a and 13b. Movement of the studs 16a and 16b within the U-shaped slots causes an extension in the bail arm as it passes across the front of the spool.

A further modified embodiment is shown in FIGS. 4, 5, 10 and 11. In greater detail, each of the bearing slots 13a and 13b is replaced by first and second slots 63a-1 and 63a-2 of circular arc shapes respectively. Each of the studs at the supports 7 and 9 is replaced by first and second studs 66a-2 and 66a-2. The circular arc of the first slot 63a-1 is centered at the basic arm-supporting point of the second stud 66a-2 within the second slot 63a-2 and that of the second slot 63a-2 is centered similarly at the point of the first stud 66a-1 within the first slot 63a-1.

In this instance, the cams and cam contact faces in FIG. 3 are unnecessary for the reason that the support 7 firstly swings around the second stud 66a-2 to move the first stud 66a-1 along and within the first slot 63a-1 so that the stud 66a-1 reaches and abuts the terminal end of the slot. See FIG. 10. Secondly, the support 7 swings around the first stud 66a-1 to move the second stud 66a-2 until it reaches and abuts the terminal end of the second slot 63a-2, thus turning over the bail arm 10 with the crest of the intermediate portion thereof passing in the locus Y as shown in FIGS. 1, 3 and 11 by means of the action of support 7.

In addition, in the FIGS. 4, 5, 10 and 11 embodiment, the first slot 63a-1 is formed as a through hole while the second slot 63a-2 is blind and the first stud 66a-1 penetrates through the former slot and is secured by a snap ring 17a, the second stud 66a-2 being urged by a spring 20 toward the terminal end of the second slot 63a-2.

As clearly understood from the abovementioned description, the spinning type fishing reel of the invention has a bail arm which may be made smaller in diameter than conventional bail arms to thereby approach the rotary frame without excessively projecting outwardly thereof and be turned over through the front of the spool without being hit therewith in swinging motion between two positions for guiding and releasing the line. Hence, the entire fishing reel can be mounted close to the rod by a shortening of the mounting leg to the extent that the bail arm approaches the rotary frame. As a result, the reel is, when used for fishing, operable by turning the operating handle smoothly and stably, and the fishing rod is providing the reel is well balanced, handled to cast a rig at the end of the fishing line a great distance.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A spinning type fishing reel comprising: a mounting leg for fixing a reel to a fishing rod; a reel body having a projecting handle; means for rotatably mounting a rotary frame to the front of said reel body; means for mounting a spool at the front of said reel body so that said spool is movable longitudinally of said reel body; and means for radially pivotably supporting the bail arm of a semicircular shape to said rotary frame so that said bail arm is swingable in a given range with respect to said rotary frame, said bail arm having an intermediate portion passing across the front of said spool and being turned over in a swinging motion between two positions during its swinging movement, one position being where a fishing line is wound on said spool under guidance of said bail arm and the other position being said fishing line is released from said spool; said means for pivotably supporting said bail arm including:
    at least one support for supporting said bail arm to said rotary frame, said one support being fixed to one end of said bail arm and having at least one stud about which said bail arm rotates to move relative to said rotary frame;
    a bearing provided at said rotary frame to support said stud rotatably, said bearing having a slot which is elongated longitudinally of said reel body for bearing said stud therein; and,
    means responsive to pivotal movement of said support about said stud for causing said stud to move longitudinally along said slot, whereby when said bail arm is turned over, said stud is moved along said bearing slot forwardly of said reel to allow the intermediate portion of said bail arm to be shifted forwardly with respect to said spool.

2. The fishing reel according to claim 1 wherein said means for pivotably supporting said bail arm further includes means for rotatably coupling a second end of said bail arm to said rotary frame and for permitting ssid second end of said bail arm to move longitudinally of said reel body as said bail arm is turned over.

3. The fishing reel according to claim 1, further comprising a pair of supports respectively fixed to first and second ends of said bail arm, each support having at least one respective stud, and a pair of bearings respectively provided at opposite sides of said rotary frame, said bearings having respective slots which are elongated longitudinally of said reel body for rotatably supporting said studs provided at each of said supports, said means causing longitudinal movement causing each of said supported studs to move along a respective slot provided at each of said bearings in response to pivotal movement of said supports about their respective studs.

4. The fishing reel according to claim 2, wherein said means for rotatably coupling comprises a bore provided at said rotary frame supporting the second end of said bail arm, said supporting bore being formed in a slot elongated longitudinally of said reel body, and a spring inserted between one end of said elongate slot and the second end of said bail arm for urging said second end toward the rear end of said slot.

5. The fishing reel according to claim 1, wherein said support is fixed to the first end of said bail arm, and the second end of said bail arm is pivoted to said rotary frame, said bail arm being made telescopic between the second end and said intermediate portion.

6. The fishing reel according to claim 1, wherein said slot of the bearing provided at said rotary frame is formed in a circular arc shape.

7. The fishing reel according to claim 1, wherein said slot of the bearing provided at said rotary frame is formed in a U-like shape.

8. The fishing reel according to claim 1, wherein said bearing slot provided at said rotary frame comprises first and second slots, and wherein said support is provided with first and second studs respectively engaging with said first and second slots, said first and second slots being made in the form of a circular arc.

9. The fishing reel according to claim 1, wherein said means causing said stud to move longitudinally is a cam provided on said support at its one side opposite to said rotary frame, and wherein said rotary frame is provided with a cam contact face which abuts with said cam causing said stud to move along said slot and swing about the contacting point of said cam with said cam contact face when said bail arm is turned over.

10. The fishing reel according to claim 1, further comprising a protrudent support arm provided at the outer surface of said rotary frame to extend axially of said rotary frame, said support arm containing said bearing.

11. The fishing reel according to claim 10, wherein said support carried by the bearing of said support arm is provided with an arm cam which abuts against a projection provided at said mounting leg of said reel body for causing a turn over of said bail arm.

* * * * *